Aug. 23, 1966

J. M. SCHNEIDER  3,267,523

APPARATUS FOR MOULDING ARTICLES FROM PLASTICS MATERIAL

Filed April 16, 1965

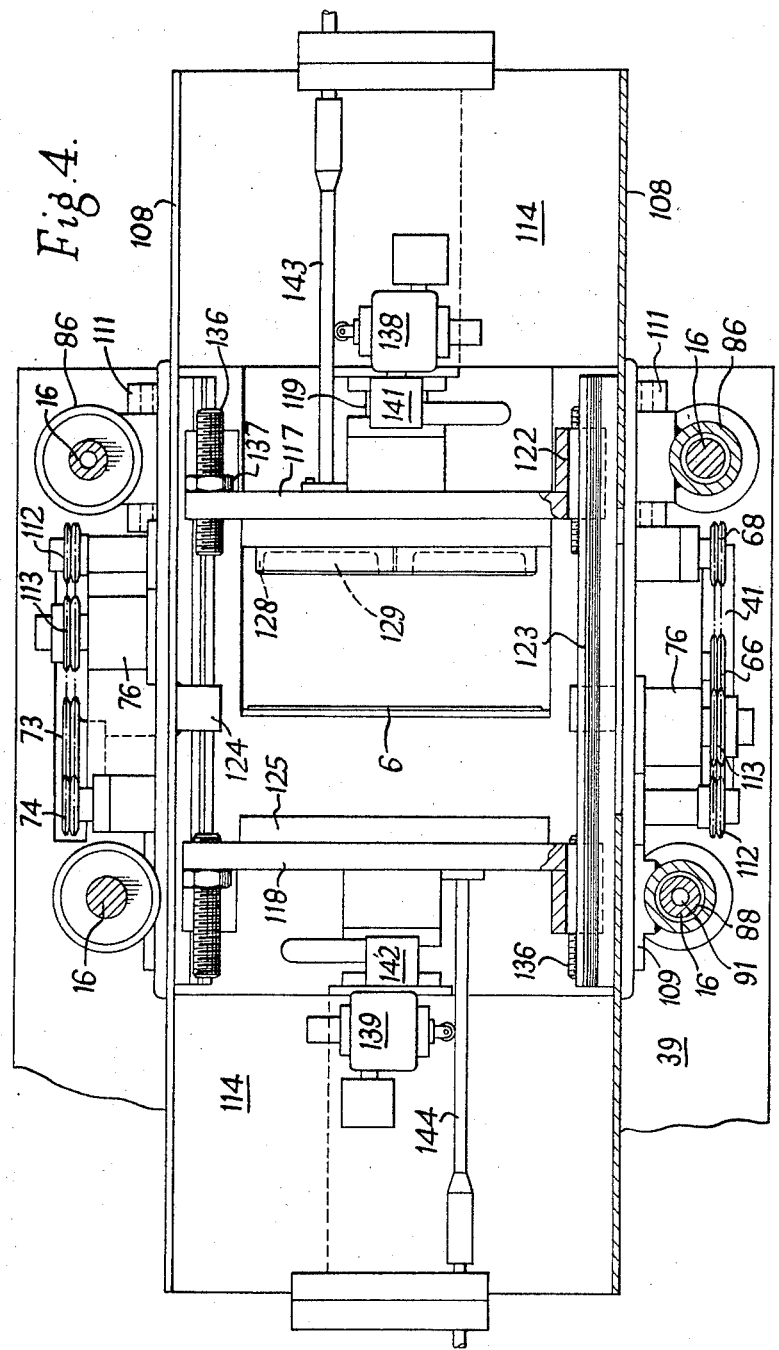

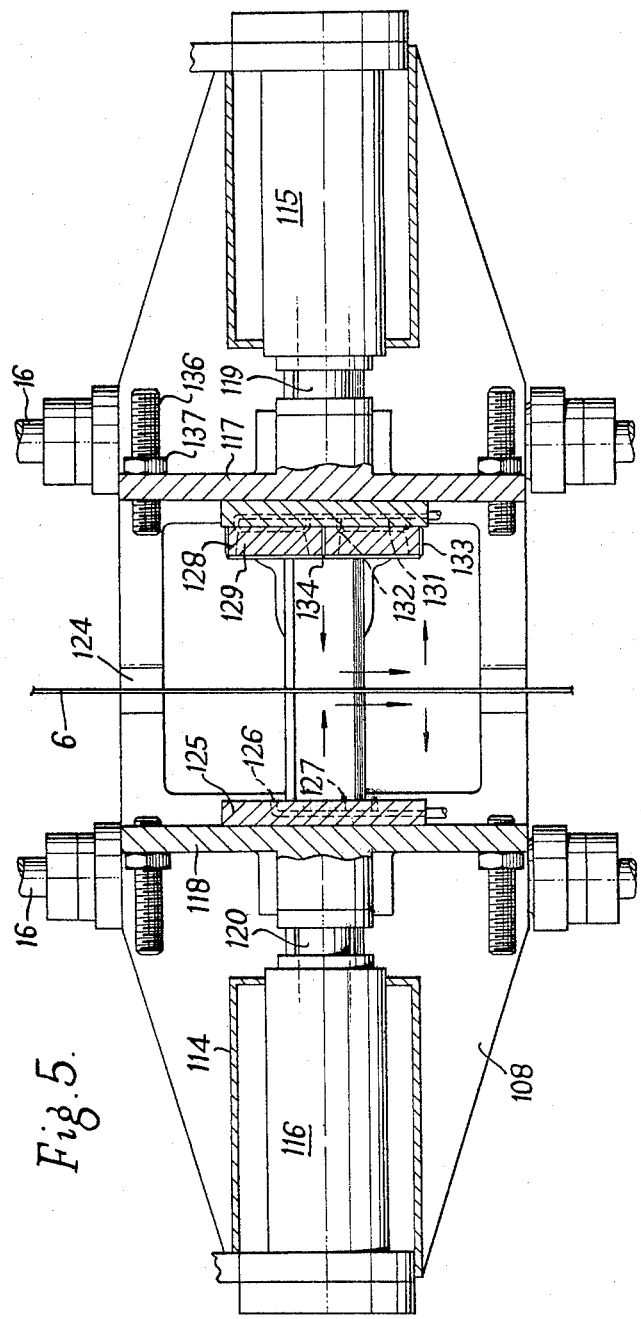

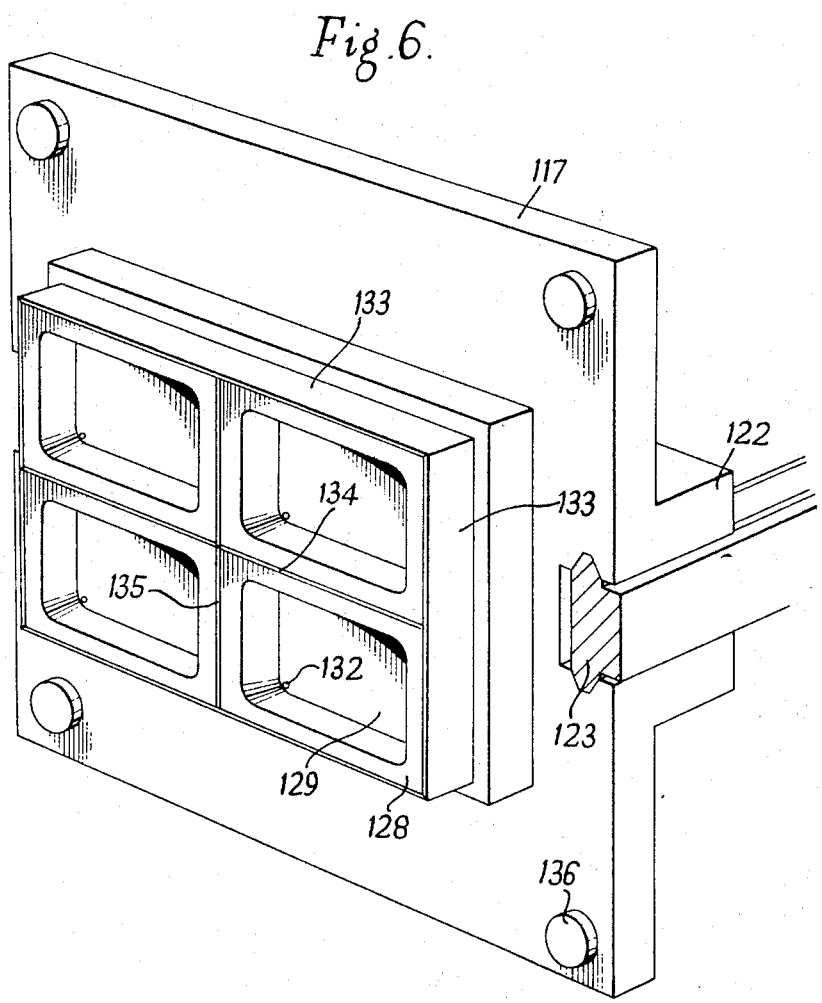

United States Patent Office 3,267,523
Patented August 23, 1966

3,267,523
APPARATUS FOR MOULDING ARTICLES FROM PLASTICS MATERIAL
Jack M. Schneider, Kingswood, Surrey, England, assignor to Calmec (Manufacturing) Limited
Filed Apr. 16, 1965, Ser. No. 448,595
Claims priority, application Great Britain, Apr. 22, 1964, 16,731/64; Oct. 21, 1964, 42,903/64
9 Claims. (Cl. 18—19)

This invention relates to apparatus for forming articles from sheet plastics material.

According to the invention, apparatus for forming articles from sheet plastics material comprises two parallel arranged, relatively movable platens respectively providing co-operating tool means adapted, when the platens are disposed in their operative positions, to form an article from a section of a sheet of hot plastics material disposed between the platens, means for effecting relative movement of the platens towards one another, stop means having parts which engage when the platens reach their operative positions and serve to retain the platens in these positions against the action of the moving means, cutting means fixedly secured to one of the platens, remotely of the stop means, and so arranged that the periphery of the sheet section is engaged from opposite sides of the sheet by the cutting means and facing parts of the other platen, respectively when the platens are in their operative positions, and means for causing the cutting means and the said facing parts to be urged together more strongly, whereby the inherent flexibility of a platen allows further, limited relative movement between the cutting means and the said facing parts sufficient to cause the sheet to be cut along at least a major part of the periphery of the section.

Preferably, the cutting means are fixedly secured to a tool on the said one platen with the cutting edges thereof projecting from the tool towards the said facing parts.

In this event the cutting means may comprise cutting elements which extend along the periphery of the said tool so that the sheet is cut along the whole of the periphery of the section.

The invention also includes a method of forming articles from sheet plastics materials, comprising disposing a section of a sheet of hot plastics material between two parallel arranged, relatively movable platens so that the periphery of the section is engaged from opposite sides of the sheet by cutting means fixedly secured to one of the platens and facing parts of the other platen, respectively, forming an article from the sheet section by co-operating tool means provided on the platens, and urging the platens together more strongly whereby the inherent flexibility of the platens allows further, limited relative movement between the cutting means and the said facing parts sufficient to cause the sheet to be cut along at least a major part of the periphery of the section.

The invention will now be described, by way of example, with reference to the accompanying drawings, in which:

FIGURE 4 is a plan view, partly in section, of a carriage upon which article forming tools of the forming apparatus of FIGURE 1 are mounted;

FIGURE 5 is a section taken along the line V—V of FIGURE 3;

FIGURE 6 is a perspective view of an article forming tool and associated parts of the forming apparatus of FIGURE 1;

Figure 1:
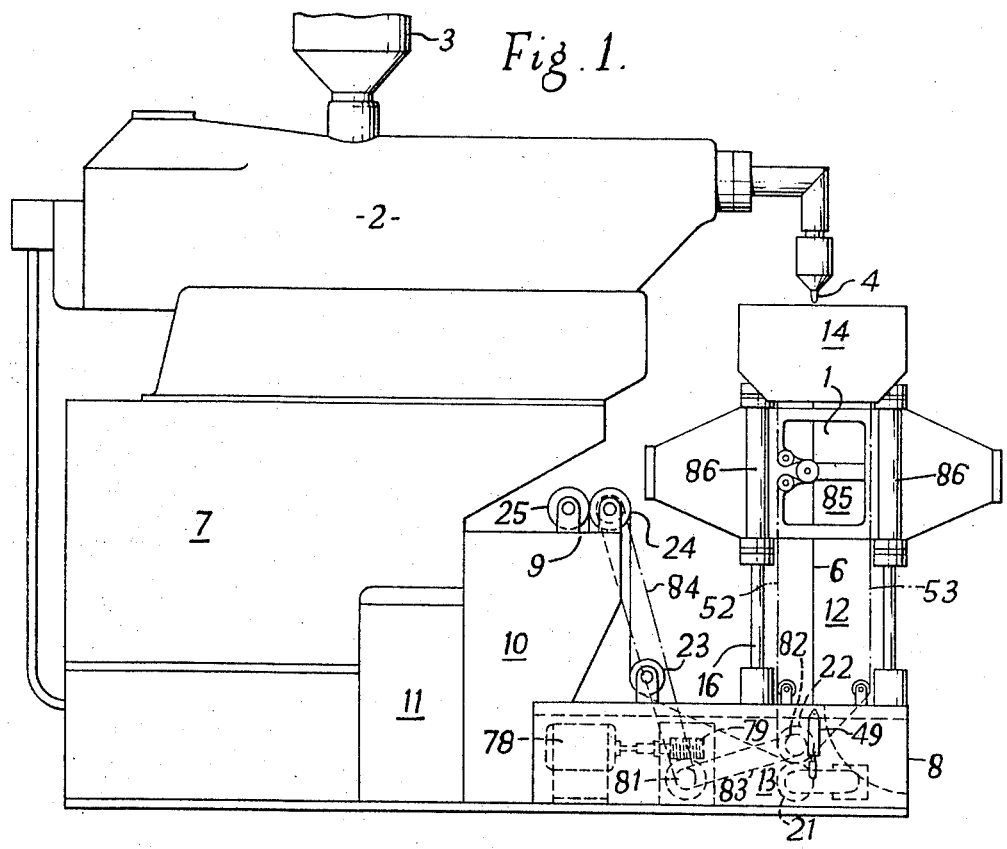
FIGURE 1 is a side elevation of an extrusion apparatus and an apparatus according to the invention for forming articles from sheet plastics material supplied from the extrusion apparatus.

Referring to FIGURE 1 of the drawings, an apparatus 1 according to the invention is for use with a conventional extruding apparatus 2 having a heating chamber, a hopper 3 for the supply of powdered plastics material to an inlet of the heating chamber, and a screw for conveying heated material from the chamber and forcing the material through an extruding die at the outlet 4 of the apparatus to form a sheet 6. The extruding apparatus 2 is mounted on a framework 7 with the extruding dies so arranged that the sheet 6 of extruded material is travelling downwardly as it emerges from the outlet 4.

The apparatus 1 operates on successive sections of sheet 6 as they emerge from the extrusion apparatus 2, tool means of the apparatus being arranged to engage a section whilst it is still hot and form the section to the shape of an article whilst moving downwardly in engagement with the section. After a predetermined interval of time sufficient for the section to cool, knives fixedly secured relative to the tool means effect cropping of the formed article from the remainder of the sheet, whereupon the tool means are disengaged and return to their initial position ready to operate on the succeeding section. The formed article is ejected from an outlet passage 8 of the apparatus 1 whilst the remainder of the sheet is returned to an inlet 9 of a granulator 10 for return to the extrusion apparatus 2.

The sequence of operations is effected automatically by means of a hydraulic circuit (shown in FIGURE 8 and described hereinafter) which includes electrically operated control valves, part of the control apparatus for the hydraulic circuit and the controls for the extrusion apparatus being located in a control cabinet 11 mounted along side and beneath the extrusion apparatus 2.

Heated sheet 6 is travelling downwardly as it emerges from the extrusion apparatus 2 and the apparatus 1 is therefore provided with an upright elongated supporting structure 12, which can be arranged beneath the outlet 4 to define a downwardly extending path for the sheet. This supporting structure includes a substantial base 13 and a supporting head 14 which is mounted on the base, immediately below the outlet 4 of the extrusion apparatus, by four upstanding pillars 16. The pillars 16 are disposed at the corners of a rectangle, when the apparatus is viewed in plan (see FIGURE 4).

Figure 2:
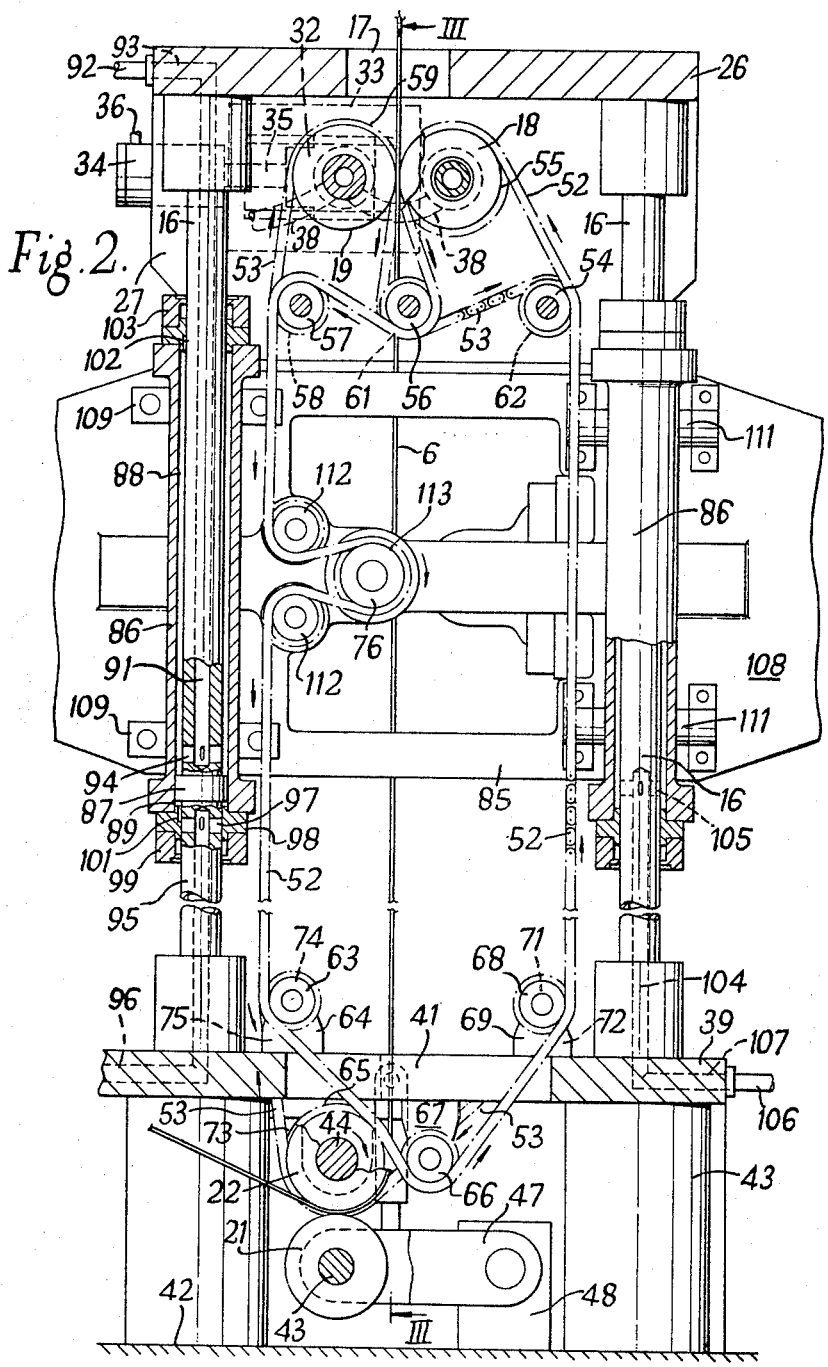
FIGURE 2 is a side elevation of the forming apparatus of FIGURE 1 with parts thereof shown in section.
Figure 3:
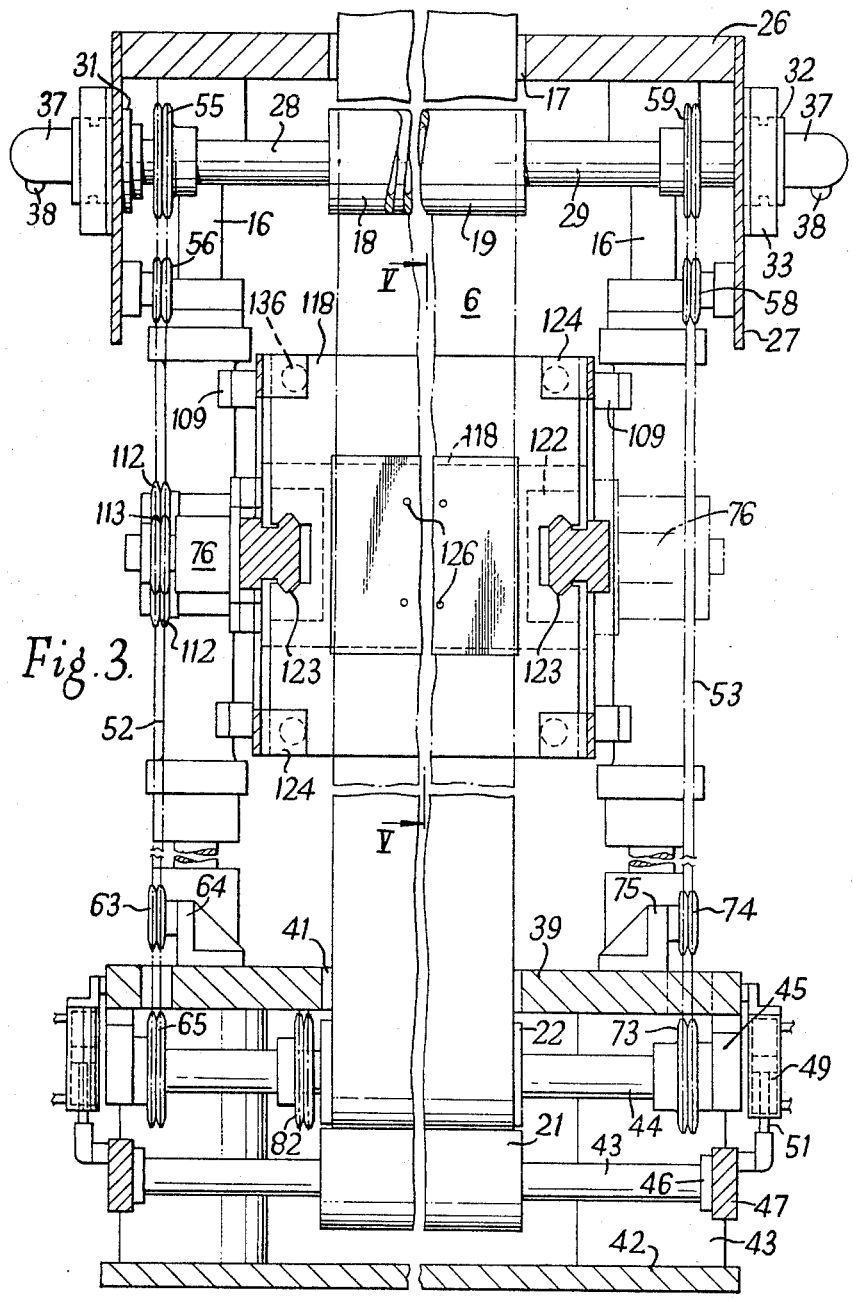
FIGURE 3 is a section taken along the line III—III of FIGURE 2.

Referring to FIGURES 2 and 3, material emerging from the outlet 4 of the extrusion apparatus 2 is drawn downwardly through an aperture 17 in the supporting head 14 by a pair of upper driving rollers 18 and 19, respectively, mounted in the head and arranged to engage opposite sides respectively of the sheet 6. The roller 19 is biassed horizontally towards the roller 18 in the manner hereinafter described so that the sheet 6 is gripped firmly between the rollers. From the upper driving rollers 18 and 19 a section of the sheet 6 travels downwardly through the space defined between the four supporting pillars 16, where an article is formed from the section, detached, and is then ejected forwardly of the apparatus through the outlet passage 8 in the base 13. As shown in FIGURE 1, the remainder of the sheet travels between a pair of lower driving rollers 21 and 22, respectively, disposed one above the other in the base 13 of the structure, upwardly and rearwardly from the rollers 21 and 22 to engage a lower part of an idler roller 23, upwardly from the idler roller 23 to a driven roller 24, and finally downwardly between roller 24 and a roller 25 to the inlet 9 of the granulator.

As shown in FIGURES 2 and 3 of the drawings, the head 14 of the supporting structure comprises a top plate 26 which is mounted on the upper ends of the pillars 16 and in which is formed the central, rectangular aperture 17 for the sheet of extruded material. Side plates 27 of the head 14 extend downwardly from the top plate 26, on opposed sides of the sheet 6, respectively, and these plates provide support for the upper driving rollers 18 and 19, driving elements associated with these rollers, and means for adjusting the horizontal location of the roller 19.

The upper driving rollers 18 and 19 are mounted on parallel shafts 28 and 29, respectively, which extend between the side plates 27 of the head and are journalled in bearings supported by the side plates. The housings 31 of the bearings which support the shaft 28 are fixedly secured relative to respective side plates 27 and are so arranged that the rearmost portion of the roller 18 contacts the front surface of the sheet 6 of plastics material. Housings 32 of the bearings for shaft 29 are mounted in horizontally extending apertures formed in respective blocks 33 on the outer surfaces of the side plates 27, the housings 32 and blocks 33 being formed with engaging tongues and grooves which permit relative horizontal movement therebetween. Adjustment of the housings 32 in the blocks 33 is effected by air pressure operated devices each of which comprises an air cylinder 34 secured to a side plate 27 of the head 14 and piston rod 35 connected to the housing. The cylinders 34 are provided with conduits 36 for the supply thereto of air under pressure.

The location of the blocks 33 relative to the side plates 27 is adjusted so as to ensure that a minimum spacing slightly less than the thickness of the sheet emerging from the outlet 4 of the extrusion apparatus 2 is provided between the rollers 18 and 19.

Each of these driving rollers 18 and 19 and their supporting shafts 28 and 29, respectively, is hollow and a universal junction 37 is provided at each end of each of the shafts. Pipes 38 are connected to the junctions 37 for supplying heated oil to the driving rollers, for purposes hereinafter described.

The base 13 of the supporting structure comprises an upper plate 39 upon which the pillars are mounted and in which there is provided an aperture 41 for the passage of sheet from which articles have been formed. Upper plate 39 is supported upon a ground-engaging plate 42 by means of pillars 43.

Disposed between the plates 39 and 42 of the base 13 of the supporting structure are the two lower driving rollers 21 and 22, arranged one above the other beneath the aperture in the plate 39. The driving rollers 21 and 22 are mounted on parallel shafts 43 and 44, respectively, which extend transversely of the structure and are journalled in bearings at their ends. The housings 45 of the bearings for the shaft 44 are mounted on brackets which depend from the upper plate 39 of the base 13 and are fixedly secured relative to that plate. The housings 46 of the bearings for the shaft 43 are mounted on respective arms 47, however, each arm being pivotally mounted at its end remote from the housing on a block 48 which is mounted on the ground-engaging plate. Pivotal movement of the arms 47 causes substantially vertical movement of the shaft 43 and roller 21, towards and away from the shaft 44 and roller 22. Adjustment of the position of the shaft 43 is effected by means of air pressure operated devices provided at opposed ends, respectively, of the shaft, each device including an air cylinder 49 which depends from the upper plate 39 and a movable piston rod 51 which is secured at its end remote from the cylinder to one of the arms 47.

For driving the upper driving rollers 18 and 19 and the lower driving rollers 21 and 22 endless duplex chains 52 and 53 are provided on opposed sides, respectively, of the supporting structure 12, each chain having an upper run within the head 14 of the supporting structure, a lower run which extends into the base 13, and upward and downward runs which extend between the base and the head.

Within its upper run the chain 52 travels from front to rear of the apparatus, i.e. from right to left as viewed in FIGURE 2 of the drawings. Thus, from an idler sprocket wheel 54 at the front of the apparatus the chain 52 initially passes upwardly over a sprocket wheel 55 on the shaft 28 of driving roller 18, downwardly from sprocket wheel 55 to engage a lower part of idler sprocket wheel 56, and finally, rearwardly to idler sprocket wheel 57 to begin its downward run. Chain 53 travels from the rear to the front of the apparatus, i.e. from left to right as viewed in FIGURE 2, during its upper run, the chain passing upwardly from idler sprocket wheel 58, over a sprocket wheel 59 on the shaft 29 of driving roller 19, downwardly to idler sprocket wheel 61 and finally across to idler sprocket wheel 62. Idler sprocket wheels 54, 56 and 58 are mounted on one side plate 27 of the head and idler sprocket wheels 58, 61 and 62 on the other side plate 27.

During its lower run the chain 52 travels from rear to front of the apparatus 1, the run extending downwardly and forwardly from an idler sprocket wheel 63, which is mounted on an upstanding bracket 64 on upper plate 39 of the base, to engage a sprocket wheel 65 on the shaft 44, beneath an idler sprocket wheel 66 on bracket 67 which depends from plate 39, and, finally, upwardly to idler sprocket wheel 68 on bracket 69. Chain 53 travels rearwardly and downwardly from idler sprocket wheel 71 on upstanding bracket 72 at the front of the apparatus to engage a lower part of sprocket wheel 73 on shaft 44 and then upwardly from sprocket wheel 73 to idler sprocket wheel 74 on a bracket 75 at the rear of the apparatus.

During its upward run the chain 52 passes directly from idler sprocket wheel 68 in the base 13 of the structure to idler sprocket wheel 54 in the head 14 and chain 53 directly from idler sprocket wheel 74 to sprocket wheel 58. During their downward runs, however, the chains 52 and 53 engage respective unidirectional clutch mechanisms 76 which are secured relative to the tool means of the apparatus and are provided for purposes hereinafter described.

The linear speeds of travel of the chains 52 and 53 are equal to one another and to the peripheral speeds of the upper driving rollers 18 and 19 and the lower driving rollers 21 and 22, which in turn determine the speed of travel of the sheet 6. Accordingly, it will be appreciated that during the major part of their downward runs the chains are moving parallel with and at the same speed as the downwardly moving sheet.

Referring now to FIGURE 1, the chains 52 and 53 are driven by means of an electric motor 78 having a worm gear 79 coupled to the output shaft thereof and mounted in the base 13 of the structure. Drive is transmitted from a sprocket wheel 81 on an output shaft of the worm gear 79 to a sprocket wheel 82 on the shaft 44 of driving roller 22 by means of an endless chain 83. Driving roller 24 is also driven at the same peripheral speed as the driving roller 22 by means of a chain 84 which engages a sprocket wheel secured to the roller shaft and a further sprocket wheel on the output shaft of the worm gear 79. Driving roller 24 and the idler roller 25 associated therewith provided with knife blades which extend normally to the axes of the rollers and cut the material into longitudinally extending strips as it passes between them to the inlet 9 of the extrusion apparatus 2.

The tools for forming an article from a section of an extruded sheet and knives for detaching an article from the remainder of the sheet are mounted on a carriage 85 which is movable upwardly and downwardly relative to the supporting structure 12. This carriage includes four upright cylinders 86 each of which embraces a section of a pillar 16 of the structure and is of length approximately equal to one-half the height of the pillar.

Referring to FIGURE 2 of the drawings, a piston 87 is secured to a central section of each of a first pair of diagonally opposed pillars 16 and is disposed within the upright cylinder 86 associated with the pillar so as to divide the cylinder into upper and lower chambers 88 and 89, respectively. The upper part of each of this first pair of pillars 16 is formed with an axially extending passage 91 which is connected to an inlet pipe 92 on the head 14 of the structure by means of a passage 93 in top plate 26 and is connected to the interior of the upper chamber 88 of the associated cylinder 86 by means of radial ports 94 close to the piston 87. A further axial passage 95 is formed in the lower part of each of this pair of pillars 16 and communicates with an inlet pipe (not shown in the drawings) via a passage 96 in the upper plate 39 of the base and with the interior of the lower chamber 89 of the cylinder via ports 97.

Supply of liquid under pressure to the upper chambers 88 via passages 92 and 93 and withdrawal of liquid from the lower chambers 89 via passages 95 and 96 causes the cylinders 86, and hence the carriage 85, to be moved upwardly relative to the supporting structure 12 whilst supply of liquid to the lower chambers 89 and withdrawal from the upper chambers 88 effects downwards movement of the carriage.

In FIGURE 2 of the drawings the carriage 85 is just approaching its uppermost position and a central section 98 of a lower end closure 99 of each of this first pair of cylinders 86 extends above the radial ports 97. Communication between these ports and the lower chamber 89 of the cylinder 86 is then restricted to a narrow channel 101 in this central section of the end closure and the rate of exhaust of liquid from the chamber is reduced. The carriage is therefore de-celerated so that the lower end closure 99 of the cylinder does not impinge against the piston 87 with too much force.

Narrow channels 102 in upper end closures 103 of the first pair of cylinders 86 ensure that a similar de-celerating effect is produced when the carriage approaches its lowermost position.

Each of the other pair of diagonally opposed pillars 16 of the supporting structure 12 is formed with an axial passage 104 which extends upwardly from the upper plate 39 of the base 13 to radial ports 105 which open into the cylinder 86 associated with that pillar. Liquid under pressure is supplied to this other pair of cylinders 86 via respective inlets 106 and passages 107 in the upper plate 39 and axial passages 104 and radial ports 105 in the pillars 16. From this pair of cylinders liquid is supplied via pipes (not shown in the drawings) to hydraulic mechanisms on the carriage 85 for operating the tools and knives in the manner hereinafter described.

On each side of the carriage 85 is an upstanding side plate 108 which is secured to the two cylinders 86 on that side of the structure 12. As indicated in FIGURES 2 and 4, each side plate 108 is fixedly secured to a cylinder 86 disposed rearwardly of the sheet by means of a pair of brackets 109 and is secured to a cylinder disposed forwardly of the sheet by respective trunnions 111. The carriage 85 can therefore rotate slightly about a horizontal axis parallel with the plane of the sheet 6 when it is subjected to large forces during operation of the tools.

Mounted on each side plate 108 are two idler sprocket wheels 112, which are disposed vertically one above the other, and one of the unidirectional clutch mechanisms 76 which is disposed at a vertical location intermediate those of the sprocket wheels 112 and is spaced horizontally therefrom. During its downward run each chain engages the two idler sprocket wheels 112 which are disposed on the same side of the apparatus as the chain and in travelling from one sprocket wheel to the other engages a major portion of a sprocket wheel 113 on the unidirectional clutch mechanism 76.

When the carriage 85 is moving downwardly the clutch mechanisms 76 are engaged and serve to prevent the speed of the carriage from exceeding that of the chains 52 and 53, i.e. the speed of movement of the sheet 6. During upward movement of the carriage 85 the clutch mechanisms 76 are disengaged, however, and the carriage can be returned rapidly to its uppermost position.

At the front and rear of the carriage and extending between its side plates 108 are pairs of parallel arranged, horizontal supporting plates 114 (see FIGURE 5) and between the pair of plates 114 at the front and rear of the carriage are mounted cylinders 115 and 116, respectively, of hydraulically operated devices. Rectangular platens 117 and 118 are mounted on piston rods 119 and 120, respectively, of these hydraulic devices, the platens being upright and disposed on opposed sides of the sheet 6, respectively.

Referring to FIGURES 3 to 6, mounted on the side of each of the platens 117 and 118 which is remote from the sheet 6 are two guide blocks 122, each disposed midway between the upper and lower edges of the platen and close to an upright side edge thereof. A horizontally extending recess is formed in each guide block 122 and the upper and lower faces of the recess are formed with grooves which engage a guide element 123 secured to a side plate 108 of the carriage 85.

Operation of the above-mentioned hydraulically operated devices causes relative movement between cylinders 115 and 116 and respective piston rods 119 and 120 upon which the platens are mounted and engagement between guide blocks 122 and respective guide element 123 serves to ensure that this movement is restricted to directions normal to the plane of the sheet material. Two stop elements 124 are secured to each side plate 108 of the carriage and serve to limit advance of the platens towards the sheet, as hereinafter described.

Secured to the inwardly facing side of each of the platens 117, 118 is a tool for use in forming an article from a section of the sheet 6 of hot plastics material. The tool 125 which is provided on the platen 118 disposed rearwardly of the sheet 6 has an operative face which is substantially flat but is formed with apertures 126 and passages 127 through which gas under pressure may be applied to the rear face of the sheet. The operative face of the tool 128 on the forwardly disposed platen 117, however, is formed with recesses 129 to shape corresponding to the shape of the article or articles, to be formed from the sheet. In the present instance four open-topped containers each having a rectangular base and rectangular side walls are to be formed from a single section of sheet and the forward tool is therefore formed with four recesses 129. Passages 131 communicate with four openings 132 at respective bottom corners of each recess so that a reduced pressure may be provided on the forwardly facing side of the sheet 6.

For detaching an article from the sheet at the end of a forming operation the forward tool 128 is also provided with cutting means in the form of knives which extend along the periphery of articles to be cut from the section of sheet material between the tools (see FIGURES 5 to 7). In the present case, where four separate articles are to be detached at the end of a forming operation, four main knife blades 133 are secured to respective sides of the tool so as to form a rectangle when viewed from the rear of the apparatus. Additional knife blades 134 and 135 extend parallel with horizontal and vertical pairs of knife blades 133, respectively, and each defines the boundary between an adjacent pair of articles.

The knives 133 and 134 and 135 are all fixedly secured to the tool 128 on the forward platen 17, and hence are fixed relative to the platen itself. Each knife is arranged with its cutting edge projecting rearwardly of the tool face by a distance equal to 1½ times the thickness of the material which is being formed, i.e. for material of 0.010 inch in thickness the knives project 0.015 inch.

Close to each of the four corners of each platen is a threaded aperture which extends through the platen and engaged in these apertures are respective stop screws 136. Each stop screw is provided with a locking nut 137.

The four stop screws 136 of the rearward platen 118 extend forwardly through the platen and in use of the apparatus are adjusted so that their forward ends engage respective stop elements 124 on side plates 108 of the carriage 85 when the operative face of the tool 125 just touches the rear surface of the sheet 6.

The stop screws 136 on the forward platen 117 project rearwardly thereof and engage respective stop elements 124 when the knives 133, 134 and 135 just touch the front surface of the sheet.

Mounted on the upper of the two supporting plates 114 at the front and rear of the carriage are respective switches 138 and 139 and de-celeration valves 141 and 142, see FIGURE 4, and associated with the switches are respective actuating rods 143 and 144 which extends parallel with the direction of movement of the platens on the carriage. The end of each rod which is remote from the associated platen 117 or 118 is of enlarged diameter and is arranged to engage and operate the associated switch when the platen is moved inwardly towards the sheet and the tool thereon is about to engage the sheet. Actuation of a switch 138 or 139 in this manner effects operation of the associated de-celeration valve 141 and 142 which causes de-celeration of the platen in the manner hereinafter described.

When the carriage 85 has completed its downward movement relative to the supporting structure 12 and an article has been formed by the tools 125 and 128 and detached by the knives 133, 134 and 135, the article is ejected from the outlet passage 8 in the base 13 of the structure by a blast of air. This air is supplied through a pipe connected to the front tool 128 but not shown in the drawings.

For effecting upwards and downwards movement of the carriage 85, movement of the tools 125 and 128 into and out of engagement with a sheet section, and operation of the knives 133, 134 and 135 for detaching a formed article from the sheet, the apparatus is provided with a hydraulic circuit including control valves which are electrically operated. Microswitches are mounted on the supporting structure 12 so as to be engaged by the carriage and effect operation of the various valves, and hence the carrying out of the various operations performed by the apparatus sequentially and in a predetermined time relationship.

Figure 8:
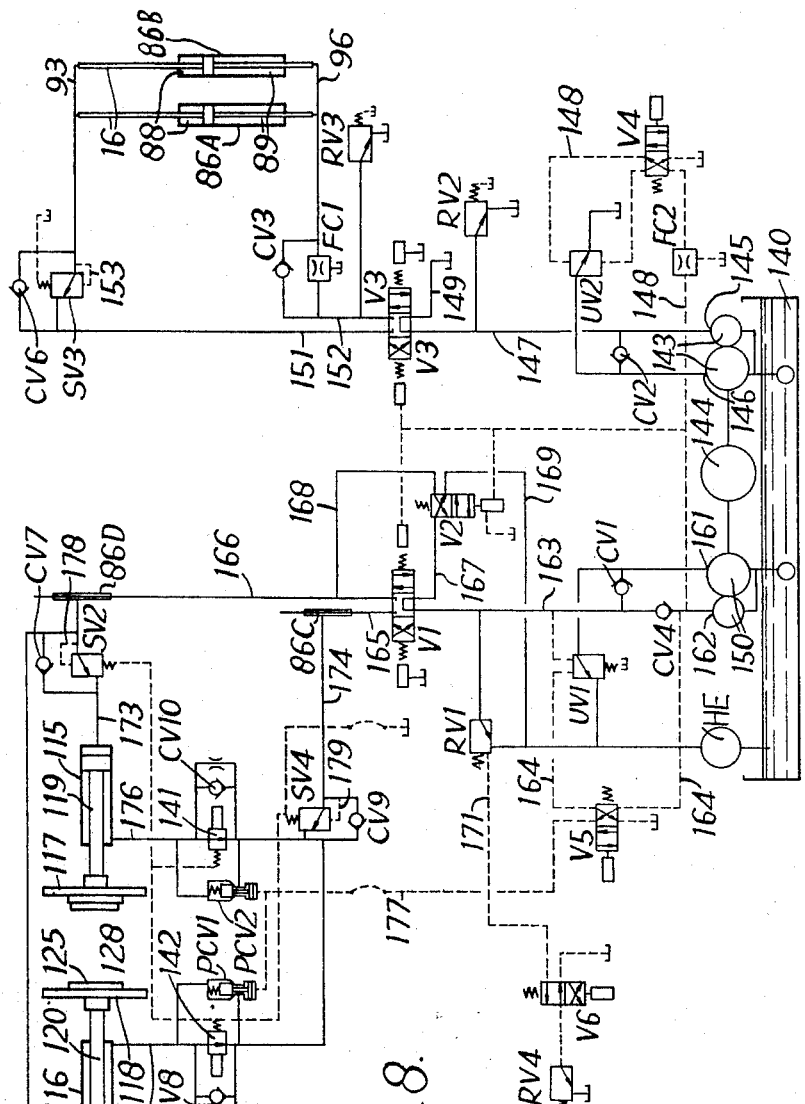
FIGURE 8 shows diagrammatically the hydraulic circuit for controlling the operations of the forming apparatus.

In this circuit, which is shown in FIGURE 8 of the drawings, liquid under pressure for raising and lowering the carriage 85 is supplied from a tank 140 by means of a double-pump 143, and liquid under pressure for moving the tools 125 and 128 is supplied from a second double pump 150. Both pumps are driven by an electric motor 144.
150. Both pumps are driven by an electric motor 144.

The pump 143 has two outlets 145 and 146 for supplying liquid to a main supply line 147, at rates equal to 8 and 50 gallons per minute, respectively. Outlet 145 of the pump is connected directly to the line 147 but outlet 146 is connected to the line via a one way check valve CV2 and is also connected to tank via a pilot-operated unloading valve UV2. Operation of unloading valve UV2 is controlled by a liquid in a pilot line 148 which extends from an outlet 162 of pump 150, via a flow control valve FC2 and a solenoid operated four-way valve V4 to the valve UV2, and then from valve UV2 to tank via the valve V4.

Main supply line 147 is connected to a first inlet of a solenoid-operated valve V3 which has a first outlet thereof connected to tank by means of a line 149, and second and third outlets connected to lines 151 and 152, respectively. A one-way check valve CV6 which is in parallel with a pilot operated stop valve SV3 connects the line 151 to the inlet pipe 92 on the head 14 of the supporting structure and thence via passage 93 and passages 91 to the upper chamber 88 of each of the first pair of diagonally opposed cylinders of the carriage 85, designated 86A and 86B, respectively, in FIGURE 8. Line 152 is connected to the lower chamber 89 of each of the cylinders 86A and 86B by means of a parallel circuit consisting of a one-way check valve CV3 and a flow control valve FC1, passage 96 in the upper plate 39 of the base of the supporting structure and a passage 95 in the associated pillar 16.

Pressure relief valves RV2 and RV3 are connected between lines 147 and 152, respectively, an tank.

Operation of the hydraulic circuit to effect raising and lowering of the carriage 85 relative to the supporting structure 12 takes place as follows.

As the carriage 85 approaches its lowermost position on the structure the outlet 146 of pump 143 is connected to tank by the unloading valve UV2 and liquid is being supplied from the outlet 145 to the lower chambers 89 of the cylinders 86A and 86B via line 147, valve V3 and flow control valve FC1. Upon reaching its lowermost position the carriage engages a first microswitch which is mounted on the supporting structure and controls the operation of solenoid operated valves V3 and V4, the spool of each valve being moved to the left of the position shown in FIGURE 8.

The outlet 145 of pump 143 is therefore connected to the upper chambers 88 by means of line 147, valve V3, line 151 and one-way check valve CV6 and liquid is supplied to these chambers at a rate of 8 gallons per minute. Liquid flows out from the chambers 89 to tank, via check valve CV3 and valve V3, at a corresponding rate and the carriage 85 therefore begins to rise slowly. Operation of valve V4 allows liquid to flow in pilot line 148, at a rate determined by the setting of flow control valve FC2, and, accordingly, at a predetermined time after the beginning of the upward movement of the carriage the unloading valve UV2 is operated and outlet 146 of the pump 143 is disconnected from the tank. Liquid is then supplied from outlet 146 through check valve CV2 to the line 147, and hence to chambers 88, at a rate of 50 gallons per minute, causing the carriage to rise rapidly.

Shortly before reaching its uppermost position the carriage 85 engages a second microswitch on the supporting structure, which causes valve V4 to be returned to the position shown in FIGURE 8, whereupon unloading valve UV2 operates to connect outlet 146 to tank again. Liquid is now supplied to chamber 88 from the outlet 145 only, so that the rate of ascent on the carriage is decreased. At the same time a further decelerating effect is produced by means of narrow channels 101 in the lower end closures of the cylinders 86A and 86B, as described above.

Upon reaching its uppermost position the carriage 85 effects operation of a third microswitch which operates solenoids respectively associated with valves V3 and V4, causing V3 to move to the right from the position shown in FIGURE 8 and V4 to move to a position in which liquid can flow in pilot line 148. With the valve V3 in this position liquid under pressure is supplied from the outlet 145 of pump 143 to the lower chambers 89, via line 152, flow control valve FC1 and passage 96, at a rate determined by the setting of FC1. A pressure is therefore exerted on the liquid in the upper chambers 88 and this pressure is transmitted via passage 93 to pilot line 153, causing stop valve SV3 to open. Liquid can now flow from the upper chambers 88 to tank, via valves SV3 and V3, and the carriage begins to descend. Moreover, after a predetermined interval, determined by the setting of the flow control valve FC2, unloading valve UV2 operates to disconnect outlet 146 of pump 143 from the tank and liquid is then supplied from both outlets 145 and 146 to the chambers 89.

It will be appreciated that the maximum rate at which liquid can be supplied to the lower chambers 89, determined by flow control valve FC1, is arranged to be sufficient to cause the carriage 85 to descend at a slightly faster speed than the speed of travel of the sheet 6 of plastics material. However, as explained above, the engagement of unidirectional clutch mechanisms 76 with respective chains 52 and 53 serves to ensure that the carriage 85 moves downwardly as the same speed as the sheet.

When the carriage approaches its lowermost position at the end of a forming operation a fourth microswitch is engaged, causing operation of valves V4 and UV2 to decelerate the carriage. The above cycle of carriage movements is then repeated.

The pump 150 has two outlets 161 and 162 for supplying liquid to a main supply line 163 at rates respectively equal to 35 and 8 gallons per minute. Outlets 161 and 162 are connected to the line 163 by respective one-way check valves CV1 and CV4, and outlet 161 is also connected to tank via a pilot operated unloading valve UV1 and a heat exchanger HE. Operation of unloading valve UV1 is controlled by liquid in a pilot line 164 which extends from the outlet 162 of the pump 150, via a solenoid-operated four-way valve V5 to tank.

The main supply line 163 is connected to a first inlet of a solenoid-operated valve V1 which has a first outlet thereof connected by line 165 to one of the second pair of diagonally opposed cylinders 86, designated 86C in FIGURE 8, and a second outlet connected by line 166 to the second of this pair of cylinders, designated 86D. A third outlet of the valve V1 is connected to a solenoid operated valve V2 by means of a line 167, the valve V2 having one outlet connected by line 168 to the line 166 and a second outlet connected by line 169 and the heat exchanger HE to tank.

A pressure relief valve RV1 is connected to main supply line 163 and is adapted to connect this line to tank via the heat exchanger HE if the pressure in the line exceeds approximately 2000 lbs. per square inch. If the pressure is below this value the valve RV1 connects the line 163 via a line 171 to an inlet of a solenoid operated valve V6 which has an outlet connected to tank by a second relief valve RV4. Valve RV4 is set to open at a pressure of from 80 to 200 lbs. per square inch.

From the cylinder 86D liquid is supplied directly along a line 172 to the cylinder 116 of the hydraulic device which is disposed at the rear end of the carriage 85, line 172 being connected to the side of the piston remote from piston rod 120, platen 118 and tool 125 mounted thereon. This cylinder 86D is also connected by means of a parallel circuit, consisting of a one-way check valve CV7 and a pilot operated stop valve SV2, and a line 173 to the cylinder 115 of the hydraulic device at the front of the carriage, line 173 being connected to the side of the piston remote from piston rod 119, platen 117 and tool 128.

The cylinder 86C is connected by means of a line 174, a parallel circuit comprising a pressure control valve PCV1, the mechanically operated deceleration valve 142, mentioned above, and a one-way check valve CV8, to a line 175, which in turn is connected to the chamber in cylinder 116 through which the piston rod 120 extends. Line 174 also connects the cylinder 86C to the cylinder 115 via a parallel circuit consisting of stop valve SV4 and check valve CV9, a parallel circuit comprising a pressure control valve PCV2, the mechanically operated de-celeration valve 141, mentioned above, and one-way check valve CV10, and a line 176. Pressure control valves PCV1 and PCV2 are connected to a pilot line 177 which extends via the solenoid-operated valve V5 to tank.

Operation of the hydraulic circuit to effect movement of the platens 117 and 118 and their associated tools 128 and 125, respectively, relative to the carriage 85 and the cropping of formed articles from the sheet 6 by knives 133, 134 and 135 is carried out as follows.

As the carriage 85 begins its downward movement from the top of the supporting structure 12 it engages a fifth microswitch which causes operation of a solenoid controlling the valve V1, moving the spool of this valve to the right from the position shown in FIGURE 8. Unloading valve UV1 is closed and liquid under pressure is therefore supplied from both outlets 161 and 162 to the line 163, and through the valve V1 to line 166 and the cylinder 86D. Valve V6 is open so that the pressure in line 163 is determined by the setting of relief valve RV4, i.e. 80 to 200 lbs. per square inch. From the cylinder 86D liquid flows directly along line 172 to the cylinder 116 but is prevented from reaching cylinder 115 by the check valve CV7 and stop valve SV2. Liquid flows out from the cylinder 116 via line 175, valve PCV1, line 174, the cylinder 86C, valve V1, line 167, valve V2, line 169 and heat exchanger HE to tank. The piston in cylinder 116 is therefore moved from left to right in FIGURE 8, causing the platen 118 and tool 125 to advance towards the sheet 6.

After the platen 118 has moved through a predetermined distance it operates a sixth microswitch which is mounted on the carriage 85 and upon operation energises the solenoid associated with valve V2, moving the spool of this valve upwardly from the position shown in FIGURE 8. Line 167 is therefore connected directly to the line 168, and thence to line 166, the cylinder 86D and line 172 so that liquid leaving one side of the piston in cylinder 116 is fed round to the other side as an addition to liquid supplied to this other side from pump 150. The piston in cylinder 116, piston rod 120, platen 118 and tool 125 are therefore advanced rapidly towards the sheet 6.

When the platen 118 is a predetermined distance from the sheet a seventh microswitch on the cariage 85 is operated by the platen, causing valve V2 to be returned to the position shown in FIGURE 8 and valve V5 to be moved to the right from the position shown in the figure. The movement of valve V2 prevents liquid flow from line 167 to 168, reducing the flow of liquid along line 166 to that supplied from the pump 150. The movement of V5 operates unloading valve UV1 to connect outlet 161 of the pump 143 to tank, thereby reducing the volume of liquid supplied along line 166 from the pump 150, and in addition allows a flow of liquid to tank along line 177, thereby causing pilot control valve PCV1 to close. These three changes all serve to decelerate the inwards movement of the platen 118 and its tool 125. Moreover, flow of liquid from the cylinder 116 along line 175 to line 174 must now pass through deceleration valve 142 which, as described above, is operated to cause a final deceleration just before the platen 118 reaches its operative position in which the stop screws 136 on the platen 118 engage respective stop elements 124 on the carriage and the front face of tool 125 just touches the rear surface of sheet 6.

As the platen 118 reaches its operative position an eighth microswitch on the carriage 85 is operated by the platen and causes operation of valve V5 to disconnect line 177 from tank and effect operation of unloading valve UV1, thereby disconnecting the outlet 161 of pump 150 from tank.

Since the piston in cylinder 116 has reached the limit of its movement towards the sheet 6 the supply of liquid along line 172 causes an increased pressure to build up in this line, and hence in pilot line 178. Pressure in line 178 causes the valve SV2 to open so that liquid can now flow from the cylinder 86D along line 173 to the cylinder 115 at the front of the carriage 85. The piston, piston rod 119, platen 117 and tool 128 associated with this cylinder are now moved inwards by means of a similar sequence of valve operations to that described in connection with cylinder 116, inward movement being complete when the stop screws 136 on the platen 117 engage respective stop elements 124 and knives 133, 134 and 135 on the tool 128 just touch the front surface of the sheet 6.

As the carriage 85 moves down with a section of the sheet 6 engaged between the tool 125 and the knives 133, 134 and 135 on the tool 128, a ninth microswitch is operated by the carriage and causes a vacuum pump to be connected to the passage 131, openings 132 and the interior of recesses 129 of tool 128, and a tenth microswitch to be operated and cause air to be blown through passages 127 and openings 126 on to the rear face of the sheet. The section of sheet between the tools 125 and 128 is therefore drawn forwardly so that parts thereof enter respective recesses 129 in the tool 128 and assume the shape of these recesses.

After a further predetermined interval of time sufficient for the engaged sheet section to have become cooled, the downwardly moving carriage operates an eleventh microswitch on the supporting structure with causes momentary operation of valve V6 to close relief valve RV4. The pressure in line 171, and hence the pressure in lines 163, 166, 172 and 173, can therefore rise to a valve determined by the setting of relief valve RV1, i.e. approximately 2000 lbs. per square inch.

The increased pressure in lines 172 and 173 is transmitted to the liquid in respective cylinders 115 and 116 and to the pistons therein, causing the tools 128 and 125 to be urged into engagement with the sheet by a greatly increased force. The corner of each platen 117 and 118 is, of course, prevented from further movement towards the sheet by engagement to stop screws 136 with respective stop elements 124. However, the increased force which is now applied to the central part of each platen and the inherent flexibility of the material of each platen are such that these central parts are caused to move a few thousandths of an inch closer together. In so doing the knives 133, 134 and 135 on the platen 128 pierce the sheet 6 to detach the four formed articles therefrom.

Immediately after this cutting operation the downwardly moving carriage operates a twelfth microswitch which causes the valve V1 to be moved to the left of the position shown in FIGURE 8. Liquid under pressure is now supplied from outlets 161 and 162 of the pump 150 via line 163, valve V1 and line 165 to the cylinder 86C. From this cylinder the liquid flows along line 174 and through check valve CV8 and line 175 to the cylinder 116 but is prevented from reaching cylinder 115 by the check valve CV9 and stop valve SC4. At the same time liquid can flow from the other side of the piston in cylinder 116 to tank via line 172, the cylinder 86D, line 166, valve V1, line 167, valve V2, line 129 and heat exchanger HE. The piston in the cylinder 116 therefore moves so that the platen 118 and tool 125 are moved rearwardly of the carriage 85, away from the sheet 6.

When the position in cylinder 116 and the associated piston rod 120, platen 118 and tool 125 have reached their rearward position the pressure in the chamber on side of the piston through which the rod 120 extends increases and this increase in pressure is transmitted via line 175 to line 174, and hence the pilot line 179, causing valve SV4 to open. Liquid under pressure can now flow from line 174 through the valve SV4, check valve CV10, and line 176 to the cylinder 115 and the platen 117 and tool 128 associated with this cylinder are moved forwardly away from the sheet 6 in a similar manner to that described for platen 118 and tool 125.

When the platen 118 and tool 125 have reached their forward position the platen causes operation of a thirteenth microswitch, which causes air to be blown along passage 131 and openings 132 in the tool 128. The four formed articles are therefore blown from the tool 128 and fall through an aperture in the upper plate 32 of the base of the structure and emerge from the outlet 8. The cycle of operations can then be repeated.

With the apparatus out of use the carriage 85 is, of course, in its lowest position.

To commence operations the heaters of the extrusion apparatus 2 are turned on and powdered plastics material is supplied to the inlet thereof via the inlet hopper 3. The valves V1 and V3 of the hydraulic circuit shown in FIGURE 8 are moved into the positions shown in this figure, so that the outlets 161 and 162 of pump 150 and the outlets 145 and 146 of pump 143 are connected to tank and the electric motor 144 is switched on.

When the extrusion apparatus 2 is working, sheet extruded from its outlet is arranged so that it travels downwardly between the upper driving rollers 18 and 19 of the apparatus 1, through the space defined by the four pillars 86 of the supporting structure 12, between the lower driving rollers 21 and 22, and then via the rollers 23, 24 and 25 to the inlet 9. The motor 78 in the base of the apparatus is switched on so that the roller 24 and the lower driving rollers 21 and 22 are rotated and drive is transmitted via the chains 52 and 53 to the upper driving rollers 18 and 19. The speed of rotation of the upper driving rollers 18 and 19 is adjusted by varying the speed of motor 78 and the spacing of these rollers adjusted by means of the air pressure operated devices comprising respective cylinders 34 and piston rods 35, the adjustments being such that sheet is drawn downwardly from the outlet 4 at a rate which, in accordance with the rate at which material is being extruded, produces the desired sheet thickness.

With the sheet being extruded from outlet 4 and travelling down the supporting structure 12 properly the valve V3 is moved to the left from the position shown in FIGURE 8 of the drawings and the carriage 85 begins to ascend, first slowly, then rapidly, and finally again slowly, in the manner described above. Upon reaching the top of the structure the carriage begins to descend, first slowly and then at a rate equal to the rate of downward travel of the sheet, as described, and then engages the fifth microswitch which sets in motion the above mentioned sequence of platen movements.

Figure 7A:
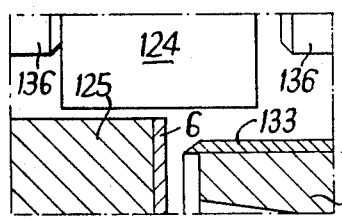
FIGURES 7A to 7E show, diagrammatically, successive stages in the forming of an article by the forming apparatus of FIGURE 1 and the detaching of the formed article from the sheet.
Figure 7B:
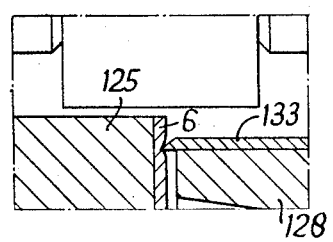
Figure 7C:
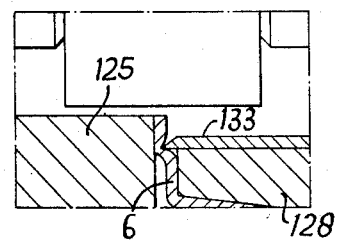
Figure 7D:
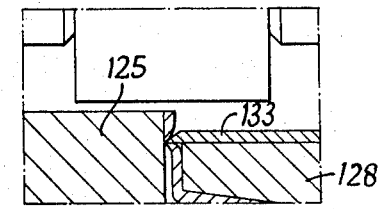
Figure 7E:
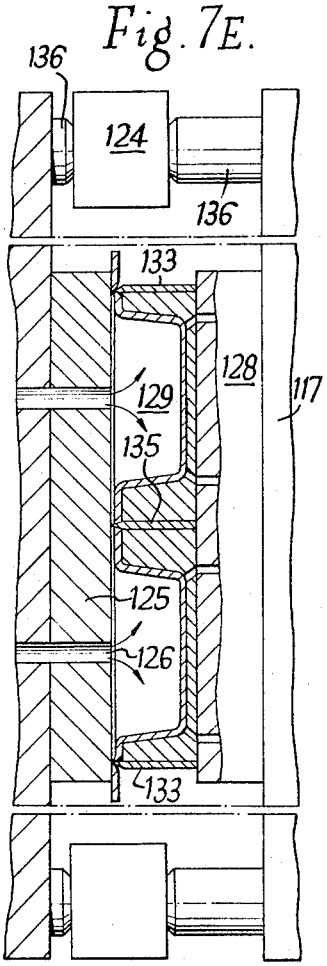

FIGURES 7A to 7E show, diagrammatically successive stages in the forming of articles and the cutting of the formed articles from the sheet 6. In FIGURE 7A the stop screws 136 on the rear platen 118 have already engaged respective stop elements 124, so that the tool 125 is in contact with the rear surface of the sheet 6, and the stop screws 136 on the front platen 117 are just approaching respective stop elements 124. FIGURE 7B shows the stop screws 136 on the front platen 117 in their engaged positions, with the knives 133, 134 and 135 just contacting the front surface of the sheet, and it is at this stage that forming takes place, the sheet being drawn forwardly into the recesses 129 of the tool 128, as shown in FIGURE 7C. FIGURES 7D and 7E both show the apparatus at the moment when an increased pressure has been applied to the cylinders 115 and 116, urging the platens 117 and 118 more strongly together and causing the knives 133, 134 and 135 to engage the front face of tool 125 and in so doing pierce the sheet 6.

Immediately after this cutting operation the carriage 85 operates the twelfth microswitch and sets in motion the above described sequence of operations involving withdrawing the rear platen 118 and forward platen 117 from the sheet and ejecting the formed articles from the recesses 129. The carriage 85 is then decelerated, stops, and commences its return, upward movement as described.

In order to prevent wastage of sheet material the return, upward movement of the carriage 85 is made as rapid as possible relative to the speed of downwards movement so that the amount of sheet material between successive sections engaged by the tools 125 and 128 is a minimum. Preferably the time during which a section of the sheet is engaged by the tools for forming and cutting is such that the vertical location of the upper edge of the section at disengagement of the tools is just above the original vertical location of the lower edge at engagement. By the time the disengaged tools have been returned to their uppermost position the upper edge of this formed section has moved down to the original vertical location of the lower edge. The tools can therefore be moved inwardly to engage a succeeding section of sheet which is adjacent the formed section.

It will be appreciated that although in the above apparatus the tool 125 on the rear platen 118 has a flat operative face this tool could have projecting proportions which engage the sheet as the platen approaches its operative position and forces the hot sheet into the recesses 129 in the forward tool 128.

Further, it will be appreciated that it is not necessary for both platens 117 and 118 to be movable but that one could be fixed permanently in its operative position. Such an apparatus might be arranged with the platens disposed in horizontal planes, the lower platen being fixed to a bedplate of the apparatus and the upper plate movable upwardly and downwardly relative thereto. Sheets of hot plastics material to be formed into articles could then be individually placed on the lower platen rather than fed continuously from an extrusion apparatus.

I claim:

1. Apparatus for forming articles from sheet plastics material comprising two parallel arranged, relatively movable platens respectively providing co-operating tool means adapted, when the platens are disposed in their operative positions, to form an article from a section of a sheet of hot plastics material disposed between the platens, means for effecting relative movement of the platens towards one another, stop means having parts which engage when the platens reach their operative positions and serve to retain the platens in these positions against the action of the moving means, cutting means fixedly secured to one of the platens, remotely of the stop means, and so arranged that the periphery of the sheet section is engaged from opposite sides of the sheet by the cutting means and facing parts of the other platen, respectively when the platens are in their operative positions, and means for causing the cutting means and the said facing parts to be urged together more strongly, whereby the inherent flexibility of a platen allows further, limited relative movement between the cutting means and the said facing parts sufficient to cause the sheet to be cut along at least a major part of the periphery of the section.

2. Apparatus as claimed in claim 1, wherein the cutting means are fixedly secured to a tool on the said one platen with the cutting edges thereof projecting from the tool towards the said facing parts.

3. Apparatus as claimed in claim 2, wherein the cutting means comprise cutting elements which extend along the periphery of the said tool so that the sheet is cut along the whole of the periphery of the section.

4. Apparatus as claimed in claim 3, wherein the tool means are adapted, when the platens are disposed in their operative positions, to form a plurality of articles from a section of a sheet of hot plastics material disposed between the platens, and the cutting means comprise further cutting elements which extend across the said section so that, upon operation of the cutting means the said articles are detached from the sheet and from one another.

5. Apparatus as claimed in claim 2, wherein the cutting edges of the cutting means project from the said tool through a distance approximately equal to one and a half times the thickness of the sheet material.

6. Apparatus as claimed in claim 2, wherein the said facing parts of the other platen are parts of a tool on the said other platen.

7. Apparatus as claimed in claim 2, wherein the platens are mounted on a carriage and each platen is movable relative to the carriage towards and away from the sheet, each platen having fixedly secured thereto a part of the stop means which engages a further part of the stop means, fixedly secured relative to the carriage, when the platen is in its operative position.

8. Apparatus as claimed in claim 2 for forming articles from sheet plastics material emerging from the outlet of an extruding apparatus, comprising an elongated supporting structure upon which the platens are reciprocably mounted and which, when disposed close to the outlet of the extrusion apparatus, provides a path along which the platens can be reciprocated towards and away from the said outlet, driving means for driving material emerging from the said outlet along the path provided by the supporting structure, means for advancing the said platens, after relative movement thereof to operative positions in which a section of heated material close to the said outlet is engaged by the tool means, along the said path in a direction away from the outlet and at a rate sensibly equal to the rate of supply of material therefrom, means for withdrawing the said platens so that the tool means are disengaged from the sheet section after the forming of an article therefrom and operation of the cutting means, and means for rapidly returning the platens along the path to their initial position for engagement of the tool means with a succeeding section of the sheet.

9. Apparatus as claimed in claim 8, wherein the supporting structure is upright and provides a vertical path down which material emerging from the outlet of an extrusion apparatus can be driven and along which the tool means are reciprocable.

References Cited by the Examiner

UNITED STATES PATENTS

| | | | |
|---|---|---|---|
| 2,967,328 | 1/1961 | Shelby et al. | 18—19 |
| 3,007,201 | 11/1961 | Brummer | 18—19 X |
| 3,159,698 | 1/1964 | Suh et al. | |
| 3,166,790 | 1/1965 | Keyes | 18—19 |

FOREIGN PATENTS 1,147,007  11/1957  France.

WILLIAM J. STEPHENSON, *Primary Examiner.*